United States Patent
Markoski

(10) Patent No.: US 9,995,248 B2
(45) Date of Patent: *Jun. 12, 2018

(54) FLEX FUEL FIELD GENERATOR

(71) Applicant: INI Power Systems, Inc., Morrisville, NC (US)

(72) Inventor: Larry J. Markoski, Raleigh, NC (US)

(73) Assignee: INI Power Systems, Inc., Morrisville, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/875,369

(22) Filed: Oct. 5, 2015

(65) Prior Publication Data

US 2016/0258387 A1 Sep. 8, 2016

Related U.S. Application Data

(63) Continuation of application No. 13/343,597, filed on Jan. 4, 2012, now Pat. No. 9,175,601.

(51) Int. Cl.

| F01N 3/02 | (2006.01) |
| F02M 25/025 | (2006.01) |
| F01N 3/10 | (2006.01) |
| F01N 5/02 | (2006.01) |
| F02B 5/00 | (2006.01) |
| F02B 63/04 | (2006.01) |
| F02B 69/02 | (2006.01) |
| F01N 3/00 | (2006.01) |

(Continued)

(52) U.S. Cl.
CPC ........... *F02M 25/025* (2013.01); *F01N 3/005* (2013.01); *F01N 3/103* (2013.01); *F01N 3/20* (2013.01); *F01N 5/02* (2013.01); *F01N 13/08* (2013.01); *F02B 5/00* (2013.01); *F02B 43/10* (2013.01); *F02B 63/04* (2013.01); *F02B 63/042* (2013.01); *F02B 63/048* (2013.01); *F02B 69/02* (2013.01); *F02D 19/0615* (2013.01); *F02D 19/0649* (2013.01); *H02K 7/1815* (2013.01); *F01N 2590/06* (2013.01); *F02B 2043/103* (2013.01); *F02B 2201/064* (2013.01); *Y02T 10/16* (2013.01); *Y02T 10/20* (2013.01); *Y02T 10/36* (2013.01)

(58) Field of Classification Search
CPC .......... F01N 3/103; H02K 7/1815; F02B 5/00
USPC ...................................................... 60/309
See application file for complete search history.

(56) References Cited

U.S. PATENT DOCUMENTS

| D10,647 S | 4/1878 | Kimberly |
| 1,367,789 A | 2/1921 | Torres |

(Continued)

FOREIGN PATENT DOCUMENTS

| CA | 2860584 | 11/2014 |
| CA | 2865806 | 11/2014 |

(Continued)

OTHER PUBLICATIONS

Honda Owner's Manual Generator EU1000i, 92 pages, (2008).

(Continued)

*Primary Examiner* — Jason Shanske
(74) *Attorney, Agent, or Firm* — Evan Law Group LLC

(57) ABSTRACT

A generator system includes (i) an internal combustion engine, (ii) an exhaust gas outlet, connected to the internal combustion engine, for venting exhaust gasses, and (iii) a condenser, connected to the exhaust gas outlet, for condensing water from exhaust gasses.

16 Claims, 5 Drawing Sheets

(51) Int. Cl.
  *F02D 19/06* (2006.01)
  *F01N 3/20* (2006.01)
  *F01N 13/08* (2010.01)
  *F02B 43/10* (2006.01)
  *H02K 7/18* (2006.01)

(56) References Cited

U.S. PATENT DOCUMENTS

| | | |
|---|---|---|
| 1,467,620 A | 9/1923 | Lindsey |
| 1,573,641 A | 2/1926 | Hunt |
| 1,792,785 A | 2/1931 | Upton et al. |
| 1,835,490 A | 12/1931 | Hesselman |
| 2,211,690 A | 8/1940 | Edwards |
| 2,503,490 A | 4/1950 | Robert |
| 2,520,226 A | 8/1950 | Smith |
| 2,986,135 A | 5/1961 | Clark et al. |
| 2,995,127 A | 8/1961 | Orr |
| 3,593,023 A | 7/1971 | Dodson et al. |
| 3,760,781 A | 9/1973 | Boldt |
| 3,966,330 A | 6/1976 | Ridler et al. |
| 4,075,835 A | 2/1978 | Hattori |
| 4,109,193 A | 8/1978 | Schultheis |
| 4,143,620 A | 3/1979 | Noguchi |
| 4,150,545 A | 4/1979 | Yamazaki |
| 4,165,348 A | 8/1979 | Nakamura |
| 4,196,701 A | 4/1980 | Tamura |
| 4,221,206 A | 9/1980 | Haas |
| 4,374,508 A | 2/1983 | Pena |
| 4,386,938 A | 6/1983 | Earle |
| 4,433,548 A | 2/1984 | Hallstrom, Jr. |
| 4,438,733 A | 3/1984 | Sasaki |
| 4,470,386 A | 9/1984 | Okumura |
| 4,489,680 A | 12/1984 | Spokas et al. |
| 4,491,118 A | 1/1985 | Wooldridge |
| 4,508,071 A | 4/1985 | Drenner |
| 4,548,164 A | 10/1985 | Ylönen et al. |
| D282,252 S | 1/1986 | Yamaguchi |
| D289,033 S | 3/1987 | Makinson et al. |
| 4,724,812 A | 2/1988 | Akagi |
| D305,880 S | 2/1990 | Ito |
| 4,936,280 A | 6/1990 | Langlois |
| 4,968,941 A | 11/1990 | Rogers |
| 5,090,967 A | 2/1992 | Lindström |
| 5,119,775 A | 6/1992 | Kokubo et al. |
| 5,162,662 A | 11/1992 | Nakayama |
| 5,199,397 A | 4/1993 | Shelef et al. |
| D340,565 S | 10/1993 | Klopfenstein |
| 5,444,378 A | 8/1995 | Rogers |
| 5,447,308 A | 9/1995 | Girard |
| 5,458,350 A | 10/1995 | Johnson et al. |
| 5,460,149 A | 10/1995 | Tofel |
| 5,533,489 A | 7/1996 | Sacci et al. |
| 5,555,853 A | 9/1996 | Bowen et al. |
| 5,566,745 A | 10/1996 | Hill et al. |
| D379,640 S | 6/1997 | Gilbert |
| 5,794,601 A | 8/1998 | Pantone |
| D417,651 S | 12/1999 | Ohsumi |
| D420,465 S | 2/2000 | Cascio |
| 6,100,599 A | 8/2000 | Kouchi et al. |
| 6,112,635 A | 9/2000 | Cohen |
| D437,825 S | 2/2001 | Imai |
| D472,164 S | 3/2003 | Newton |
| 6,550,430 B2 | 4/2003 | Gray |
| 6,564,556 B2 | 5/2003 | Ginter |
| 6,581,375 B2 | 6/2003 | Jagtoyen et al. |
| D477,569 S | 7/2003 | Iwatate et al. |
| 6,585,235 B2 | 7/2003 | Pattullo |
| 6,739,289 B2 | 5/2004 | Hiltner et al. |
| D518,771 S | 4/2006 | Xiao |
| D520,948 S | 5/2006 | Xiao |
| 7,049,707 B2 | 5/2006 | Wurtele |
| D532,748 S | 11/2006 | Disbennett et al. |
| 7,161,253 B2 | 1/2007 | Sodemann et al. |
| 7,183,746 B1 | 2/2007 | Carter |
| 7,302,795 B2 | 12/2007 | Vetrovec |
| D594,819 S | 6/2009 | Yamamoto et al. |
| D597,485 S | 8/2009 | Ma |
| 7,603,983 B2 | 10/2009 | Bahner |
| 7,690,336 B2 | 4/2010 | Bowman et al. |
| 7,695,049 B2 | 4/2010 | Colborne |
| 7,765,794 B2 | 8/2010 | Alexander |
| 7,849,680 B2 | 12/2010 | Shaff et al. |
| 7,893,658 B2 | 2/2011 | Bhardwaj |
| D633,443 S | 3/2011 | Wang et al. |
| 8,061,121 B2 | 11/2011 | Haugen |
| D650,739 S | 12/2011 | Cai |
| 8,100,093 B2 | 1/2012 | Morgenstern |
| D662,881 S | 7/2012 | He et al. |
| D680,555 S | 4/2013 | Craig |
| 8,516,989 B2 | 8/2013 | Schmidt |
| 8,567,354 B2 | 10/2013 | Kealy et al. |
| 8,601,772 B2 | 12/2013 | Turpin et al. |
| 8,810,053 B2 | 2/2014 | Markoski |
| 8,698,451 B2 | 4/2014 | King et al. |
| D710,301 S | 8/2014 | Ferro |
| D711,319 S | 8/2014 | Wilcox |
| D712,834 S | 9/2014 | Munro |
| D733,052 S | 6/2015 | Markoski et al. |
| D736,932 S | 8/2015 | Nakagawa |
| 9,175,601 B2 | 11/2015 | Markoski |
| 9,188,033 B2 | 11/2015 | Markoski |
| 9,450,450 B2 | 9/2016 | Markoski |
| 2001/0047777 A1 | 12/2001 | Allen |
| 2002/0148221 A1 | 10/2002 | Jagtoyen et al. |
| 2004/0004356 A1 | 1/2004 | Akimoto et al. |
| 2004/0025817 A1 | 2/2004 | Uenoyama |
| 2004/0221828 A1 | 11/2004 | Ries-Mueller et al. |
| 2006/0065216 A1 | 3/2006 | Sugimoto |
| 2007/0107693 A1 | 5/2007 | Ohtsuji |
| 2009/0013965 A1 | 1/2009 | Bahner |
| 2009/0314243 A1 | 12/2009 | Schmidt et al. |
| 2010/0019729 A1 | 1/2010 | Kaita et al. |
| 2010/0072757 A1* | 3/2010 | Kealy .............. F01N 13/04 290/1 A |
| 2010/0192928 A1 | 8/2010 | Yuasa |
| 2010/0201328 A1 | 8/2010 | Monsive, Jr. |
| 2010/0258094 A1* | 10/2010 | Hull .............. F02B 51/04 123/536 |
| 2011/0114068 A1 | 5/2011 | Habing et al. |
| 2011/0168128 A1 | 7/2011 | Bradley et al. |
| 2012/0012574 A1 | 1/2012 | Vandrak et al. |
| 2012/0247435 A1 | 10/2012 | Veerathappa et al. |
| 2012/0291420 A1 | 11/2012 | Kim et al. |
| 2013/0131966 A1 | 5/2013 | Hirano |
| 2013/0152898 A1 | 6/2013 | Ki et al. |
| 2013/0158837 A1 | 6/2013 | Jung et al. |
| 2013/0168969 A1 | 7/2013 | Markoski |
| 2013/0221684 A1 | 8/2013 | Markoski |
| 2015/0014998 A1 | 1/2015 | Markoski |
| 2015/0034025 A1 | 2/2015 | Markoski et al. |
| 2016/0084201 A1 | 3/2016 | Markoski et al. |
| 2016/0258352 A1 | 9/2016 | Markoski |
| 2016/0258387 A1 | 9/2016 | Markoski |
| 2017/0054321 A1 | 2/2017 | Markoski et al. |
| 2017/0130676 A1 | 5/2017 | Markoski et al. |

FOREIGN PATENT DOCUMENTS

| | | |
|---|---|---|
| CA | 2865806 | 5/2015 |
| CN | 200952429 Y | 9/2007 |
| CN | 201045307 | 4/2008 |
| CN | 102104280 | 6/2011 |
| CN | 201330438963.6 | 2/2014 |
| CN | 201380014569.7 | 5/2015 |
| CN | 201380014569.7 | 11/2015 |
| CN | 201530380535.1 | 3/2016 |
| CN | 201280070700.7 | 7/2016 |
| CN | 2012-80070700.7 | 4/2017 |
| DE | 10 2009 052 571 A1 | 5/2011 |
| EM | 001440077 | 10/2015 |
| EP | 0 999 359 | 5/2000 |
| EP | 1 069 295 A2 | 1/2001 |
| EP | 1 383 224 A1 | 1/2004 |
| EP | 1 505 709 A2 | 2/2005 |

(56) References Cited

FOREIGN PATENT DOCUMENTS

| | | |
|---|---|---|
| EP | 2 327 864 | 6/2011 |
| EP | 12821085.3 | 10/2013 |
| EP | 12821085.3 | 9/2015 |
| EP | 13709278.9 | 12/2015 |
| EP | 12821085.3 | 1/2016 |
| FR | 2 815 486 | 4/2002 |
| FR | 2 959 888 A1 | 11/2011 |
| FR | 2 962 002 A1 | 12/2011 |
| GB | 2 184075 A | 6/1987 |
| GB | 1302360.1 | 3/2013 |
| GB | 1302360.1 | 8/2013 |
| GB | 1302360.1 | 1/2014 |
| IL | 233473 | 1/2015 |
| IN | 256526 | 12/2013 |
| IN | 276173 | 2/2016 |
| JP | 64-32060 | 2/1989 |
| JP | 2010-236301 | 9/1998 |
| JP | 11-190220 | 7/1999 |
| JP | 2001-27128 | 1/2001 |
| JP | 2003-219573 | 7/2003 |
| JP | 2003-293771 | 10/2003 |
| JP | 2003-293788 | 10/2003 |
| JP | 2004-245219 | 9/2004 |
| JP | 2006-188980 | 7/2006 |
| JP | 2008-54442 | 3/2008 |
| JP | 2008/067496 | 3/2008 |
| JP | 2008/67496 | 3/2008 |
| JP | 2008-255831 | 10/2008 |
| JP | 2010-20906 | 1/2010 |
| JP | 2010-158129 | 7/2010 |
| JP | 2010-279107 | 12/2010 |
| JP | 2011-120346 | 6/2011 |
| JP | 2011-252407 | 12/2011 |
| JP | 2012-7508 | 1/2012 |
| JP | 2012-23825 | 2/2012 |
| JP | 2012-34488 | 2/2012 |
| JP | 2014-551271 | 2/2015 |
| JP | 2014-559960 | 3/2015 |
| JP | 2014-559960 | 9/2015 |
| JP | 2014-551271 | 12/2015 |
| JP | 2014-559960 | 1/2016 |
| WO | WO 95/26464 | 10/1995 |
| WO | 1999/35389 | 7/1999 |
| WO | 2010/068284 | 6/2010 |
| WO | WO 11/015731 A1 | 2/2011 |
| WO | WO 2012/005021 | 1/2012 |
| WO | WO 2012/011568 | 1/2012 |
| WO | PCT/US2012/070849 | 3/2013 |
| WO | PCT/US2012/071042 | 6/2013 |
| WO | WO 13/103532 A1 | 7/2013 |
| WO | WO 13/103542 A2 | 7/2013 |
| WO | WO 13/130533 | 9/2013 |
| WO | PCT/US13/27922 | 11/2013 |
| WO | PCT/US13/27922 | 1/2014 |
| WO | PCT/US2012/070849 | 7/2014 |
| WO | PCT/US2012/071042 | 8/2014 |
| WO | PCT/US13/27922 | 9/2014 |
| WO | PCT/US2015/050437 | 12/2015 |
| WO | 2016/048752 | 3/2016 |

OTHER PUBLICATIONS

Options for Generators and Welders, located at www.hondapowerequipment.com/pdf/Accessories/ml.repap44a.generators.pdf, 15 pages, downloaded Oct. 1, 2011.
Yamaha Inverter EF2000iS Specifications, located at www.yamaha-motor.com/outdoor/products/modelspecs_pdf.aspx?Is=outdoor&mid=626&showprevmodel=0, 1 page, downloaded Oct. 2011.
Yamaha Inverter EF1000iS Specifications, located at www.yamaha-motor.com/outdoor/products/modelspecs_pdf.aspx?Is=outdoor&mid=442&showprevmodel=0, 1 page, downloaded Oct. 2011.
Specification of Honda EU1000i, located at www.hondapowerequipment.com/products/modeldetail.aspx?page=modeldetail&section=P2GG&modelname=EU1000i&modelid=EU1000IKN, 1 page, downloaded Oct. 1, 2011.
Specification of Honda EU2000i, located at www.hondapowerequipment.com/products/modeldetail.aspx?page=modeldetail&section=P2GG&modelname=EU2000i&modelid=EU2000IKN, 1 page, downloaded Oct. 1, 2011.
Honda Power Equipment Decibels chart, located at www.hondapowerequipment.com/images/dbchart.jpg., 1 page, downloaded Oct. 1, 2011.
Yamaha Generator Owners Manual EF1000iS, 51 pages, 2004.
"Gasoline", Wikipedia, pp. 1-13, found at http://en.wikipedia.org/wiki/gasoline, printed on Dec. 4, 2012.
"Petrol-paraffin engine", Wikipedia, pp. 1-2, found at http://en.wikipedia.org/wiki/petrol-paraffin_engine, printed on Dec. 3, 2012.
United Kingdom Search and Examination Report dated Mar. 27, 2013 for GB application No. GB1302360.1, 10 pages.
International Search Report dated Mar. 15, 2013 for PCT application No. PCT/US/2012/070849.
Translation of Japanese Office Action dated Feb. 12, 2015.
Translation of Japanese Office Action dated Mar. 2, 2015.
Sep. 12, 2013, U.S. Appl. No. 13/343,597.
Jan. 15, 2014, U.S. Appl. No. 13/343,597.
Jan. 6, 2014, U.S. Appl. No. 13/408,903.
Feb. 28, 2014, U.S. Appl. No. 13/408,903.
Apr. 16, 2014, U.S. Appl. No. 13/408,903.
Dec. 15, 2014, U.S. Appl. No. 29/449,784.
Dec. 31, 2014, U.S. Appl. No. 14/370,374.
Mar. 9, 2015, U.S. Appl. No. 29/449,784.
Feb. 25, 2015, U.S. Appl. No. 14/370,374.
May 15, 2015, U.S. Appl. No. 14/370,374.
May 22, 2015, U.S. Appl. No. 29/449,784.
Jun. 16, 2015, U.S. Appl. No. 14/370,374.
Jun. 26, 2015, U.S. Appl. No. 14/370,374.
Sep. 30, 2014, U.S. Appl. No. 13/343,597.
May 5, 2015, U.S. Appl. No. 13/343,597.
Jun. 22, 2015, U.S. Appl. No. 13/343,597.
Jul. 30, 2015, U.S. Appl. No. 13/343,597.
Sep. 16, 2015, U.S. Appl. No. 14/370,374.
Sep. 30, 2015, U.S. Appl. No. 14/370,374.
Oct. 14, 2015, U.S. Appl. No. 14/370,374.
Nov. 4, 2015, U.S. Appl. No. 14/336,361.
Jan. 27, 2016, U.S. Appl. No. 14/493,168.
U.S. Appl. No. 14/336,361, filed Jul. 21, 2014.
U.S. Appl. No. 14/493,168, filed Sep. 22, 2014.
U.S. Appl. No. 29/522,542, filed Mar. 31, 2015.
U.S. Appl. No. 29/527,360, filed May 18, 2015.
U.S. Appl. No. 14/875,441, filed Oct. 5, 2015.
U.S. Appl. No. 14/933,859, filed Nov. 5, 2015.
PCT Search Report dated Nov. 21, 2013 for PCT application No. PCT/US2013/027922.
International Search Report dated Dec. 15, 2015 for PCT application No. PCT/US2015/050437.
"Choke Valve", Wikipedia, pp. 1-2, found at http://en.wikipedia.org/wiki/Choke_valve, printed on Nov. 2, 2016.
"Electric heater under carb, EFE (Early Fuel Evaporation", MPGresearch, found at www.mpgresearch.com/groups/induction-and-exhaust/electric-heater-under-carb-efe-early-fuel-evaporation, pp. 1-3, printed on Jun. 4, 2015.
Product Description, "Carburetor Heater for 14RESL and 14RESAL Generators", found at www.homedepot.com/p/KOHLER-Carburetor-Heater-for-14RESL-and-14RESAL-Generators-GM19462-KP1/203269638, pp. 1-2, printed on Jun. 4, 2015.
Invitation to Pay Additional Fees and Partial International Search Report dated Feb. 17, 2017 for PCT application No. PCT/US2016/059739.
Feb. 7, 2017, U.S. Appl. No. 14/493,168.
Mar. 21, 2017, U.S. Appl. No. 29/527,360.
May 23, 2016, U.S. Appl. No. 14/336,361.
Aug. 10, 2016, U.S. Appl. No. 14/493,168.
Aug. 11, 2016, U.S. Appl. No. 29/527,360.
U.S. Appl. No. 15/248,617, filed Aug. 26, 2016.
Jun. 6, 2017, U.S. Appl. No. 14/493,168.

(56) References Cited

OTHER PUBLICATIONS

International Search Report and Written Opinion dated Apr. 11, 2017 for PCT application No. PCT/US2016/059739.
Apr. 21, 2017, U.S. Appl. No. 29/527,360.
May 4, 2017, U.S. Appl. No. 15/248,617.
May 5, 2017, U.S. Appl. No. 14/933,859.
Oct. 25, 2017, U.S. Appl. No. 14/493,168.

* cited by examiner

FLEX FUEL FIELD GENERATOR

BACKGROUND

Portable generators for producing electricity are well known and have been commercially available for many years. These devices typically include an internal combustion engine, are designed to generate sufficient electrical power to run one or more common household or commercial electronic devices, and typically use gasoline as fuel. They are adapted to provide alternating current (AC) electricity, through a standard two-prong or three-prong plug receiver, at 120 or 240 volts, and at 50 to 60 Hz; also common is an additional 12 volt DC power port for charging lead acid batteries. Many of these devices are not fuel injected and include a carburetor and a manual choke. The carburetor mixes the fuel with air before it enters the cylinder. When the engine is first started (cold start), the choke is pulled out (air restricting) to minimize the amount of air mixed with the fuel, so that the cold fuel will combust properly; when the engine warms, the choke is pushed in (air non-restricting) so that the correct amount of air is mixed with fuel for proper combustion at the steady state operating temperature.

Some of the smallest commercially available portable generators include the YAMAHA Inverter EF1000iS and the HONDA EU1000i. The capacity of the fuel tanks in these types of devices is about 0.6 gallons of gasoline, allowing operation at the maximum load of around 1000 W of 4 to 6 hours, or at ¼ load for 8 to 12 hours. These generators produce less noise than larger models, having a typical sound output of 47 to 59 dB. These devices include an internal combustion engine using gasoline fuel, so they necessarily generate carbon monoxide (CO), and do not come equipped with a catalytic converter or CO safety shut down features. Thus the manufactures strongly discourage indoor use because of the danger of carbon monoxide poisoning to humans and animals. Furthermore, the exhaust gases are hot and all metal parts of the device which come into contact with the exhaust gasses also become dangerously hot.

There has been a proliferation of small portable electronic devices in recent years, most of which include small rechargeable batteries. Examples include laptop computers, mobile telephone, personal digital assistants, portable digital cameras and global positioning systems. The rechargeable batteries are most commonly lithium ion batteries, although other varieties are available. The small portable electronic devices typically include a removable power cord with a standard two-prong or three-prong plug, or a universal serial bus (USB) plug, for plugging into a corresponding plug receiver, which allows for recharging the rechargeable batteries. Also commonly available are removable power cords with a standard cigarette lighter plug, for recharging the rechargeable batteries using a cigarette lighter plug receiver in an automobile or other vehicle.

For field operation by consumers of portable appliances such as televisions and radios, and small portable electronic devices and recharging of the batteries therein, portable generators have come into common use. Although an automobile is used to get to the field location for camping or tailgating, and is therefore available for recharging batteries or for providing DC power, unless the engine and alternator are running there is a risk of draining the automobile battery, and compromising the operation or starting capacity of the automobile. If the engine is running, over extended periods of time, there will be substantial use of the gasoline from the fuel storage tank, far in excess of the amount of electricity needed to recharge batteries for small portable electronic devices. This results because the rechargeable batteries require a specific amount of time and power to recharge, and even when just idling the vehicle engine consumes far more fuel than necessary to recharge the batteries. The advantage of using a portable generator is the much greater efficiency for generating the amount of electricity needed to recharge batteries, over the period of time necessary for recharging, as compared to an automobile engine. In other words, there is a superior match between the power generation and the power consumption. Gasoline for the generator is readily available at retail gasoline refueling stations.

Often, remote field location operations are staged, first setting up a base camp, next a remote camp, and lastly individuals on foot or with only a single vehicle are sent even farther afield. Remote field location operations are therefore required to carry all supplies, especially consumable supplies, which will be needed. Not only is the total amount of supplies often minimized to reduce cost and weight, but the variety of supplies is also minimized, to reduce logistical costs and complexity in transporting materials to, and resupplying, the base camp.

To get to remote field locations, such as those in wilderness areas far away from highways, vehicles which use diesel fuel, rather than gasoline are commonly used. The supplies carried to such remote field locations only include diesel fuel, not gasoline, for the vehicles. In these cases, recharging of batteries is carried out using power generated by the vehicle, keeping the vehicle engine running while recharging the batteries or from a large 2-10 kW diesel generator carried by the vehicle. As noted above, a vehicle engine and alternator is especially inefficient for recharging small batteries. Furthermore, in these remote field locations, the noise generated by the vehicles engine or diesel generator can be especially undesirable, considering the extended period of time needed for recharging batteries. Lastly, unless constantly monitored the vehicle engine or diesel generator will continue running even if the batteries have completed recharging, continuing the consumption of diesel fuel until human intervention or until all of the fuel is consumed. Under these circumstances, the use of diesel fuel and a generator or vehicle engine vehicle alternator is particularly inefficient for recharging small batteries.

To address this inefficient use of diesel fuel in remote field location operations, other energy sources have been used, but each suffers from drawbacks. Solar power units are available, but they tend to be large and require significant set up time to spread out the solar cells for sufficient energy generation. Furthermore, sun light is only available during the day, and unpredictable cloud cover can make the availability of solar power unreliable and intermittent over the time scale of remote field location operations. Wind power is potentially available night and day, but otherwise can require similarly bulky equipment and can be similarly unreliable and intermittent. Finally, for some remote field location operations, such as during extreme weather conditions, it is required to keep all supplies and equipment indoors; neither solar power nor wind power is available indoors, and running the engine of a diesel engine indoors is too dangerous due to carbon monoxide accumulation from the engine exhaust.

In order to address the needs of remote field location operations for small amounts of electrical power over an extended period of time for both the operation of, and recharging of batteries within, small portable electronic devices, small portable generators including an internal combustion engine was considered. However, such devices still suffer from many of the disadvantages of using a vehicle engine or large diesel generator. Although less noisy, they nonetheless generate significant amounts of noise. Furthermore, indoor operation is also dangerous due to exhaust gases containing carbon monoxide. Although the use of fuel over any specific period of time is less, the small portable generators still continue to run when recharging of batteries is completed unless constantly monitored. A further disadvantage is that an additional fuel, such as gasoline, is needed since small portable generators typically do not use the same fuel as diesel vehicles, complicating the supply logistics by adding to the total amount and variety of materials.

SUMMARY

In a first aspect, the present invention is a generator system, comprising (i) an internal combustion engine, (ii) an exhaust gas outlet, connected to the internal combustion engine, for venting exhaust gasses, and (iii) a condenser, connected to the exhaust gas outlet, for condensing water from exhaust gasses.

In a second aspect, the present invention is a generator system, comprising (1) an internal combustion engine, (2) an exhaust gas outlet, connected to the internal combustion engine, for venting exhaust gasses, (3) a heat exchanger, connected to the exhaust gas outlet, for exchanging heat from exhaust gasses to water, (4) a water tank, (5) a water pump, and (6) hosing, fluidly connecting the heat exchanger, the water tank and the water pump.

In a third aspect, the present invention is a generator system, comprising (a) an internal combustion engine, (b) an exhaust gas outlet, connected to the internal combustion engine, for venting exhaust gasses, (c) a flexible pipe, connected to the exhaust gas outlet, for directing the exhaust gasses, (d) optionally, a carbon monoxide sensor, attached to internal combustion engine, and (e) optionally, a catalytic converter, for reducing carbon monoxide present in exhaust gasses, connected to the exhaust gas outlet. The pipe has a length of at least 5 feet.

In a fourth aspect, the present invention is a method of simultaneously generating electricity and potable water, comprising running a generator including an internal combustion engine, to generate electricity and exhaust gasses, and condensing and collecting water from the exhaust gasses.

In a fifth aspect, the present invention is a method of simultaneously generating electricity and heating water, comprising running a generator including an internal combustion engine, to generate electricity and exhaust gasses, and heating water, with the exhaust gasses, with a heat exchanger.

In a sixth aspect, the present invention is an improved method of setting up a remote field location operation, including transporting personnel, diesel fuel, portable electronics, rechargeable batteries, water, and food, in a diesel fuel powered vehicle, the improvement comprising further transporting a generator including an internal combustion engine and a condenser, and replacing a portion of the water with fuel for the generator.

In a seventh aspect, the present invention is an improved method of operating a remote field location operation, including recharging rechargeable batteries with a diesel vehicle engine, the improvement comprising recharging rechargeable batteries with a generator including an internal combustion engine. The generator operates with rubbing alcohol as fuel, and the rubbing alcohol is supplied in bottles, each bottle containing a unit measure of rubbing alcohol.

In an eighth aspect, the present invention is a method of generating electricity with a gasoline or propane generator having a choke, comprising operating the generator with a fuel consisting essentially of an alcohol, wherein the fuel does not comprise gasoline.

DEFINITIONS

A gasoline or propane generator is a generator including a carburetor and manual choke, which operates most efficiently using gasoline or propane, respectively, when the choke is placed in the fully open position, after the generator has been started.

DETAILED DESCRIPTION

Figure 1:
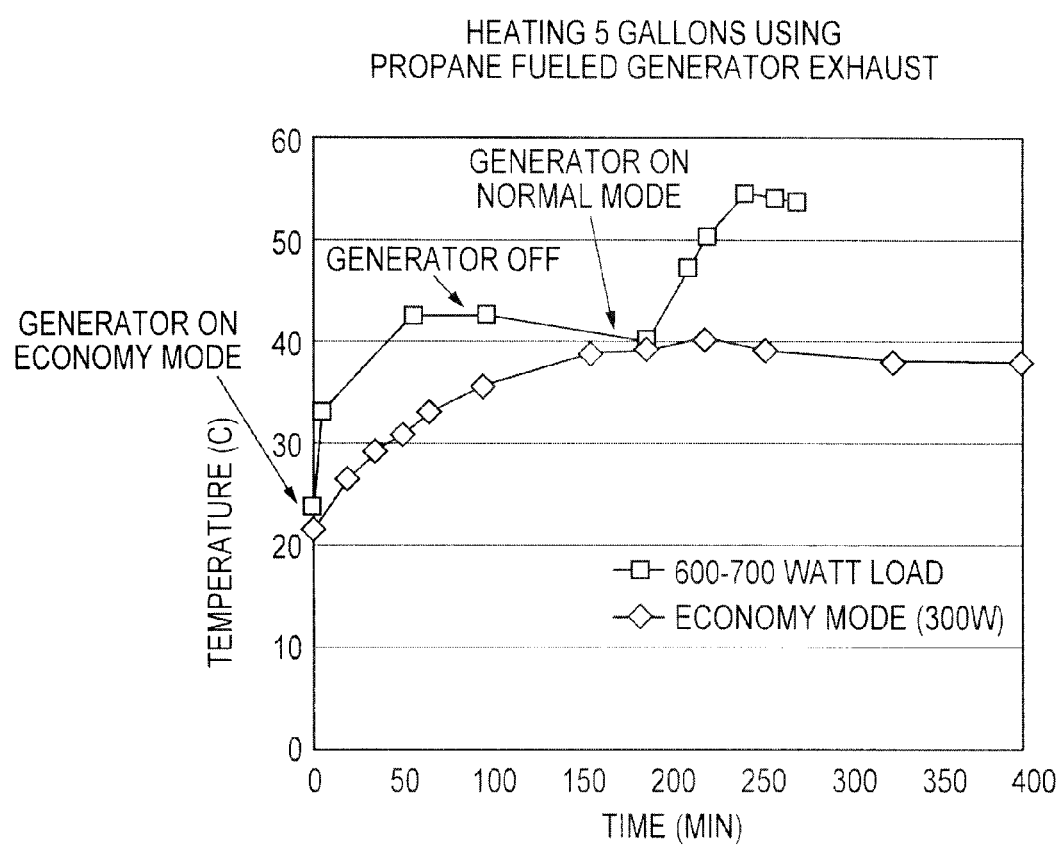
FIG. 1 is a graph showing the amount of time required to heat water using waste heat from a generator.

The present invention makes use of a variety of discoveries which individually, in combination, and in a multitude of permutations, adapt and improve a commercial generator including an internal combustion engine for remote field location operations, and furthermore add and extend functionality, including reducing logistical burdens. Adaptations for remote field location operations include one or more of the following: (a) a condenser for collecting water from exhaust gasses; (b) a heat exchanger and liquid pump for the continuous generation of pasteurized or hot water for drinking, bathing or showering; (c) a flexible pipe for transporting exhaust gasses, which may included carbon dioxide and carbon monoxide, away from the generator (which may be indoors or in a tent) to a location away from the users (such as outside or into a body of water); (d) a catalytic converter for reducing carbon monoxide of the exhaust gasses; (e) a carbon monoxide sensor for detecting dangerous levels of carbon monoxide; (f) a ventilation fan for improving ventilation and reducing the local concentration of carbon dioxide and/or carbon monoxide; (g) a cover for protecting the generator from rain; (h) a timer for selecting an amount of time for the generator to run before automatically turning off; (i) a fuel selector for adjusting settings of the generator for optimal operation of any one of a variety of liquid or gaseous fuels; (j) a bottle adaptor for holding and dispensing a liquid fuel from a unit measure in a bottle of liquid fuel, such as rubbing alcohol; and (k) a hot swap, for exchanging gaseous fuel tanks without interrupting the supply of gaseous fuel. Furthermore, if the remote field generator is operated with rubbing alcohol, in unit measures, then it may provide the logistical advantage of not requiring the transport or supply of a unique fuel for the generator.

Generators including an internal combustion engine produce exhaust which includes water vapor, carbon dioxide, partially oxidized fuel and small amounts of carbon monoxide. A water condenser may be attached to the exhaust, to reduce the thermal signature and condense and capture the water vapor as liquid water. Since the water is condensed from the gas phase, the water is clean and free of microorganisms, and is therefore potable, and may be used for drinking or bathing. If small amounts of fuel or engine oil contaminate the water, it may be further cleaned through the addition of a catalytic converter and/or filtered with an activated carbon water filter. Since most hydrocarbon fuels and alcohols contain a ratio of hydrogen to carbon of about 2:1, the weight of water produced by condensing water from exhaust gasses of the generator is about the same as the weight of fuel consumed. Inclusion of a water condenser therefore provides a dramatic logistic advantage: rather than transport both fuel and water, only fuel need be transported to the remote field location, since the fuel may be converted to an equal weight of water by using the fuel in the generator.

A water condenser functions as a heat exchanger, by removing heat from the exhaust gasses. Once the temperature of the water vapor in the exhaust is below the boiling point of water, the water vapor will condense to form liquid water. The heat may be transferred to air, or may be transferred to additional liquid water pumped through the condenser or heat exchanger. In a remote field location both the hot air and hot water produced by the heat exchanger may be used: hot air may be used to provide heat to maintain the temperature inside a tent or structure, and hot water may be used for bathing or showering or pasteurizing locally obtained water. In either case, a logistical advantage is obtained, since there is no need to carry extra fuel or equipment for heating air, or extra fuel or equipment for heating water for cooking, bathing, showering and/or drinking. In the case of transferring the heat to water, a water pump may be used to circulate the water through the heat exchanger or condenser, to and from a tank of water. Similarly, water produced by the condenser may be stored in a tank, and a pump may be used to transport the water to or from the tank or from one tank to another The water pump may be operated though an electrical port, such as a 12 V DC port, on the generator. The inclusion of a condenser or heat exchanger also provides a substantial reduction in the noise produced by the generator, in effect, acting as a muffler for the engine. A typical remote field generator may heat 5 gallons of water to 45° C. in about one hour (FIG. 1).

In another configuration, water from an additional water source, such as a well, river or tank, could be passed through the heat exchanger at a rate slow enough to achieve a specific temperature upon exiting the heat exchanger, for example at 90° C. This would avoid the need to completely heat a tank of water, greatly reducing the time need to heat a small amount of water to a desired temperature, for example for showering, cooking, or simply to pasteurize water from the water source for drinking in a single pass.

For use of a generator indoors, for example inside a tent or building where the electricity, hot air and/or hot water produced by the generator would be consumed, the oxidation products of the internal combustion process including carbon dioxide, carbon monoxide, and some trace organics of the exhaust gasses are of concern. Extended build up of carbon dioxide, which could displace oxygen in air, may cause suffocation. Furthermore, accumulation of carbon monoxide, even in small amounts, is poisonous to humans and animals. To address this problem, a pipe may be connected to the exhaust, for carrying exhaust gasses from the generator to an outdoor location. The pipe may be of any length sufficient to extend from the generator to an outdoor location, through an opening in a tent, or through a window or door, or another small opening, of a building or structure. For example, the pipe may be 5, 10, 20, 50 or 100 feet long. The pipe may be made of plastic, rubber, or even metal. Preferably, the pipe is flexible and/or elastic, such as silicone rubber. Preferably, the pipe has a wall thickness of at least ⅛ of an inch, such as ¼ to 1 inch, including ⅜, ½, ⅝, ¾, and ⅞ of an inch. Additional foam or padding may cover the pipe, to further reduce noise from the generator. Furthermore, a water condenser or heat exchanger may be located between the generator and the pipe, or may be attached to the end of the pipe away from the generator. The end of the pipe away from the generator may be placed underground or into a body of water (such as a lake, river or stream) to further dampen noise and reducing the amount of heat released with the exhaust gasses.

Additional features may be included to minimize the risk of poisoning due to carbon monoxide. For example, a catalytic converter may be included, located between the generator and the pipe, or may be attached to the end of the pipe away from the generator. The catalytic converter may catalyze the reaction of carbon monoxide and/or trace organics, with oxygen to produce carbon dioxide, reducing the total amount of carbon monoxide produced.

A carbon monoxide sensor may also be included with the generator, for detecting the level of carbon monoxide or carbon dioxide near the generator. The detector may set off an alarm when the level of carbon monoxide approaches, or reaches, a dangerous concentration. In addition to an alarm, or instead of an alarm, the carbon monoxide detector may be connected to the generator and cause the generator to turn off when the level of carbon monoxide approaches, or reaches, a dangerous concentration. Additionally, a ventilation fan, optionally connected to the carbon monoxide sensor, may also be included to provide additional ventilation and help prevent carbon monoxide poisoning. The ventilation fan may be operated from electricity produced by the generator.

During remote field location operations, it may be desirable or necessary to operate the generator outdoors. In order to protect the generator from damage from rain, a cover or sleeve may be placed over or around the generator. A cover may be as simple as a small umbrella with a self-supporting stand, protecting the generator from rain. Alternatively, or in addition, the electronics of the generator may be sealed with a polymeric material, such as silicone rubber or expanded poly(perfluoroethylene) (also known as Teflon®), to prevent water from entering the generator. In addition the sealing material may also provide a sound dampening function.

During operation, the generator may become hot. A heat shield, such as insulation or a heat reflective coating, may cover or surround the generator, keeping the heat inside the device and expelling additional heat through the exhaust gasses. A water cooled cover may also be used to remove heat from the generator. When used with an insulated pipe, the heat may be expelled with the exhaust gasses far away from the generator itself. The insulation or heat shield may also serve to further dampen noise created by the generator during operation. A noise cancellation device, which measures the sound created by the generator and then broadcasts sound which will cancel the sound created by the generator, may also be included. Such a noise cancellation device may be powered by electricity produced by the generator.

In order to avoid wasting fuel, the generator should be turned off once the task, such as recharging batteries, has been completed. However, having a person monitor the generator and the task can be inconvenient. A timer may be attached to the generator, which is connected to the generator and turns the generator off, after a preset amount of time has passed. The timer may have various settings for specific amounts of time, and/or settings labeled for specific tasks, such as recharging batteries; the task specific settings maintain operation of the generator for a predetermined amount of time necessary to complete the task. Alternatively, an amount of liquid fuel just sufficient to operate the generator for a length of time necessary to complete the task may be placed into the fuel tank of the generator, causing the generator to stop when the fuel is consumed, which would correspond to the amount of time necessary to complete the task. For example, a unit measure of fuel, such as 500 ml of rubbing alcohol, will cause a generator to run for the correct amount of time to recharge a set of lithium ion batteries. Lastly, the fuel tank of the generator could be sized at the volume necessary for a specific task, such as recharging batteries, for example at 500 ml.

It is known that alcohols, such as methanol and ethanol can be used to operate an internal combustion engine. However, small commercial portable generators built for using gasoline or propane as fuel, particularly those which include a carburetor and a choke, do not run properly using alcohols as fuels. The internal combustion engine will begin running with the choke closed using alcohols as fuels, but once it begins to heat up and the choke is opened, the engine will stall or run very inefficiently—the revolutions per minute (RPM) of the engine will be far lower than it would run using gasoline or propane.

Surprisingly, placing the choke into an intermediate position, between open and closed, will allow the engine to run efficiently using alcohols, as well as other fuels. It was unexpectedly discovered that allowing less air into the carburetor than when using gasoline or propane as fuel will provide efficient running of the engine on non-gasoline and non-propane fuels. It can be determined exactly which position the choke should be placed, by gradually moving the choke from closed to open after starting the engine; the correct position is determined by maximizing the RPM of the engine while moving the choke, either by observing the RPM of the engine directly with a tachometer, or by listening to the speed of the engine. In this way, fuels, such as alcohol, may be used to efficiently operate a gasoline or propane generator.

Similarly, small commercial portable generators built for using gasoline or propane as fuel, particularly those which include a carburetor and a choke, do not run properly using diesel fuel. Surprisingly, it has been discovered that if the generator is started using a gaseous feed fuel such as propane, for example, then the fuel feed may be switched to liquid diesel fuel when the engine has heated up to a temperature of about 100 to 125° C. At a temperature of about 100 to 125° C. the diesel fuel is easily vaporized; such temperatures may be quickly attained by limiting the cooling of the engine.

A fuel selector, including settings for different fuels, may be present on the generator. The fuel selector adjusts the generator, such as adjusting the amount of air mixed with fuel via a choke to optimally operate with the fuel selected, or start or stop a fuel pump when switching between fuels. Different fuels include liquid fuels, such as gasoline; diesel fuel; alcohols including methanol, ethanol and propanol, for example 70% or 91% isopropanol and water, isopropanol/ethanol mixtures, ethanol with a denaturing agent, including 95% ethanol and water with a denaturing agent; aldehydes and ketones, such as acetone, which may also be present as mixtures with water and/or alcohols; and mixtures of liquid fuels; and gaseous fuel including hydrogen, syngas, biogas, methane (such as natural gas), ethane, propane, butane and mixtures thereof.

A particularly preferred liquid fuel is rubbing alcohol, which includes both 91% and 70% isopropanol and water, isopropanol/ethanol/water mixtures, ethanol with a denaturing agent, including 95% ethanol and water with a denaturing agent. Rubbing alcohol is prepackaged into bottles, referred to as unit measures, typically having a volume of 1 pint, 1 quart, 500 ml, or 1000 ml. Rubbing alcohol is a medical product used to sterilize and clean medical equipment and as an antiseptic on the skin surface for disinfecting minor cuts and abrasions. Surprisingly, both 91% and 70% isopropanol and water is useful as a fuel in an internal combustion engine, in spite of the high water content. Furthermore, it is a very safe fuel: even when ignited in free liquid form, the combustion temperature is low enough that it rarely causes damage to skin and is readily extinguished with and soluble with water. Rubbing alcohol is generally included in medical supplies for remote field location operations, thus avoiding an increase in the logistical burden when used as a fuel for a generator. Other liquid fuels, such as methanol, ethanol, isopropanol, and butanol, may also be packed as unit measures of fuel, such as a bottle having a volume of 1 pint, 1 quart, 500 ml, or 1000 ml.

A bottle adaptor, adapted to receive a bottle having a volume of 1 pint, 1 quart, 500 ml, or 1000 ml, may be attached to the fuel port of the generator. The bottle adaptor may be, for example, a wide-mouth funnel, with an opening large enough to fit the bottle opening, and sides with a greater width than the width of the bottle and extending more than half the length of the bottle. With such an adapter, a bottle of rubbing alcohol may be opened and placed into the adaptor, so that all the liquid will drain into the fuel tank of the generator.

In the case of gaseous fuel, the fuel inlet may be connected to a hot swap. A hot swap is an adapter which allows a new gas tank containing fuel to be attached to the generator before a current gas tank is disconnected. In this way, the generator will continue to operate when gas tanks are changed, and the fuel supply will not be interrupted.

Figure 2:
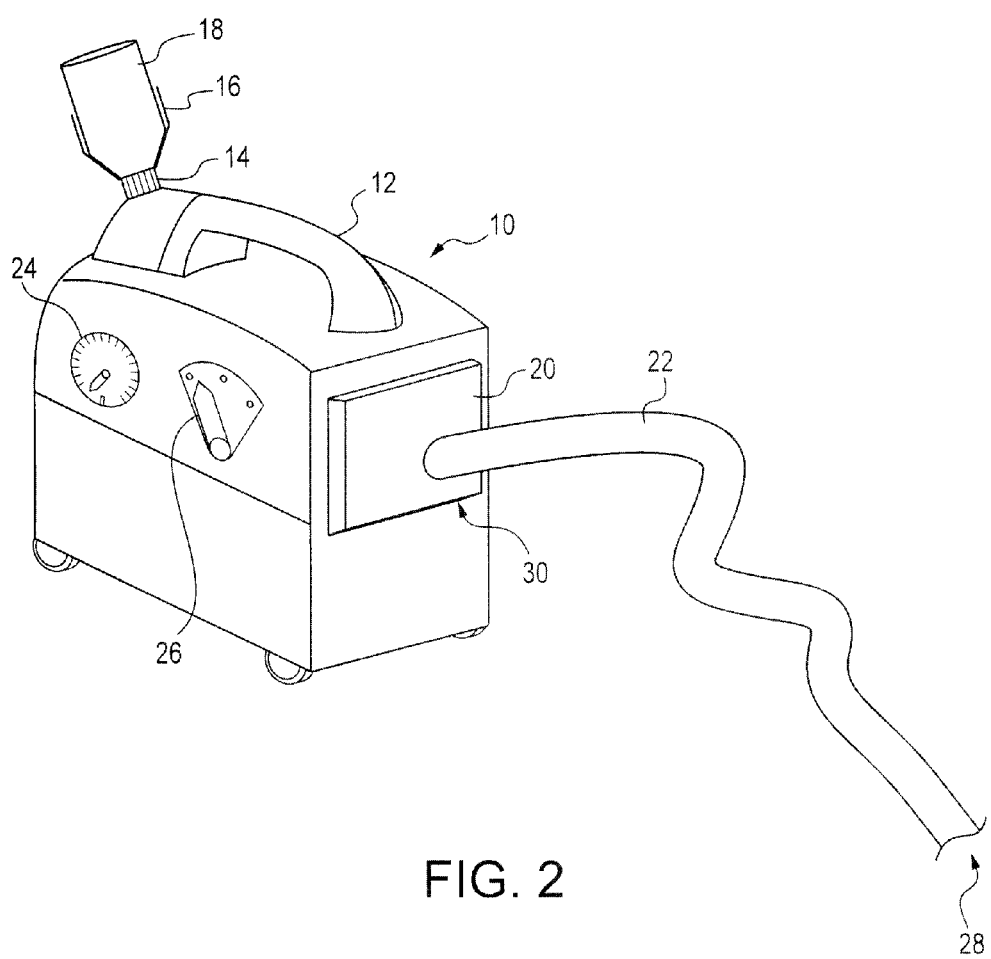
FIGS. 2-5 illustrate remote field generators.

FIG. 2 illustrates a remote field generator including aspects of the present invention. An internal combustion generator 10 includes water condenser 20 attached to the exhaust outlet 30, and a pipe 22 connected to an outlet of the condenser for directing the exhaust gasses 28 away from the generator. A timer 24 may be set by a user to a variety of setting, which variably controls the amount of time of operation of the generator. A fuel selector 26 may be set to different settings pre-calibrated for optimizing the operation of the generator for different fuels. A fuel inlet 14 includes a bottle adapter 16 for holding a bottle 18 and dispensing the contents of the bottle into the fuel tank of the generator. Also illustrated is a handle 12 for carry the generator by hand.

Figure 3:
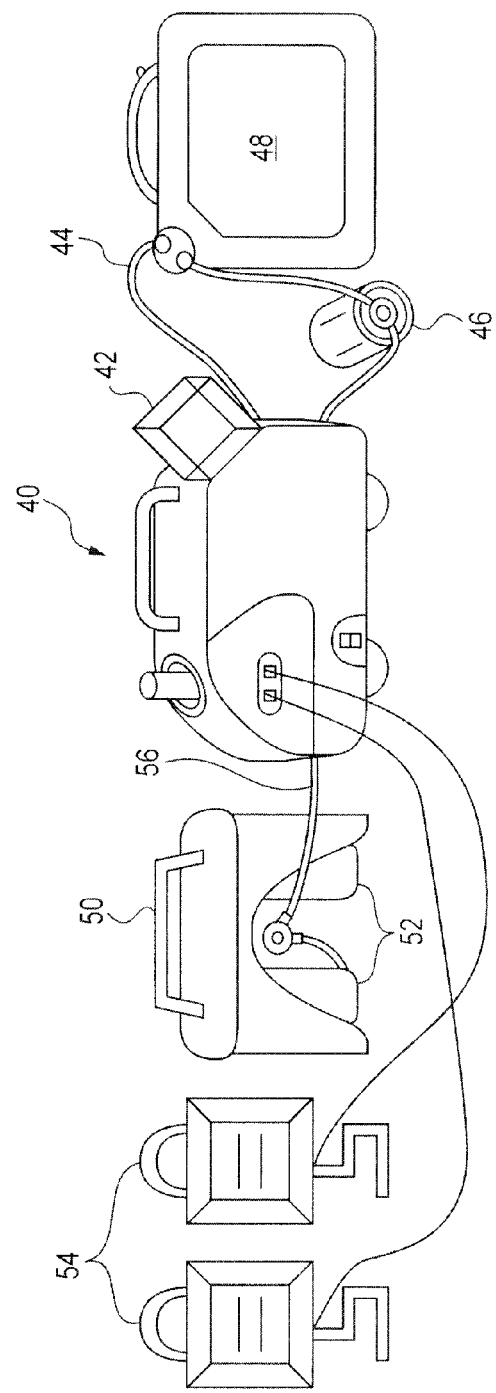
Figure 4:
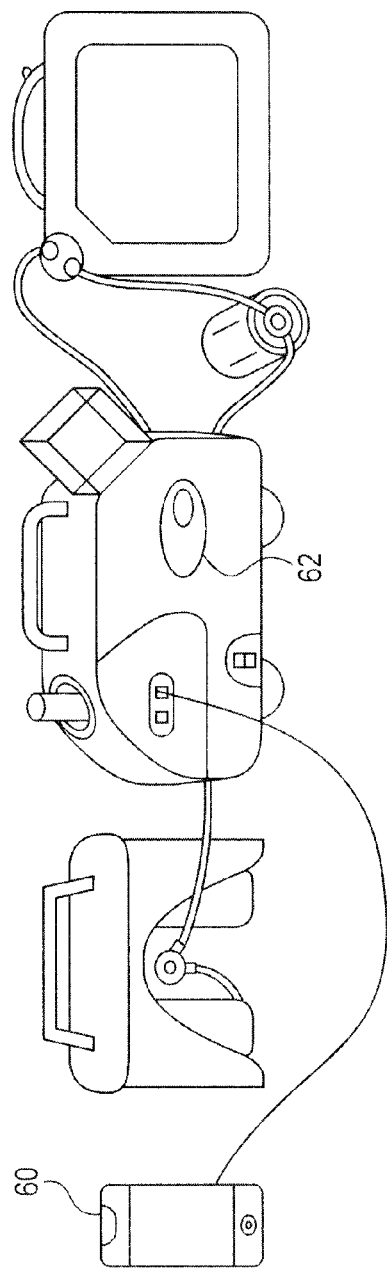
Figure 5:
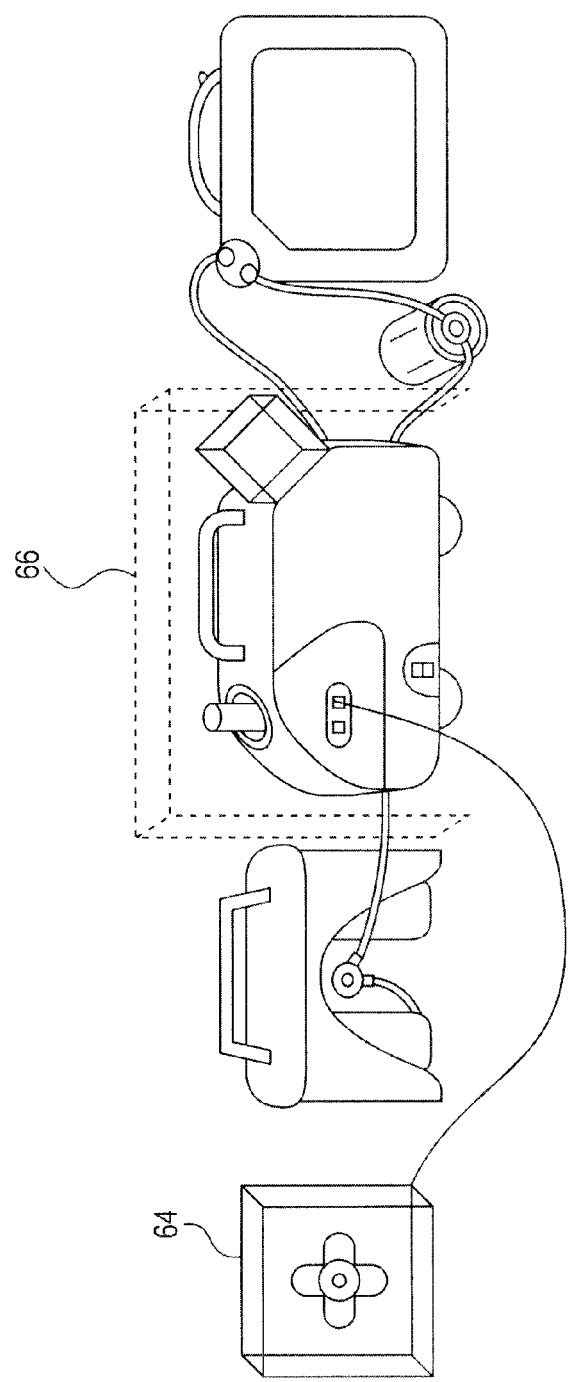

FIG. 3 illustrates a remote field generator including aspects of the present invention. An internal combustion generator 40 includes a heat exchanger 42 connect to the exhaust gas exit of the internal combustion generator. The heat exchanger uses water as a coolant, which is circulated through hosing 44 by a water pump 46 into, and out of, a tank 48. Also illustrated is a hot swap 50 including two gas tanks 52 connected via a gas line 56, which allows one of the gas tanks to be exchanged without interrupting the flow of gaseous fuel (such as propane) to the generator during operation. The illustration includes a load 54, such as flood lights, which may be operated by the electricity generated by the remote field generator. FIG. 4 is the same as FIG. 3, except a mobile phone 60 including a lithium ion battery is electrically connected to the generator, for recharging the lithium ion battery, and a carbon monoxide detector 62 is present on the generator. FIG. 5 is the same as FIG. 3, except a ventilation fan 64 is electrically connected to the generator, and a cover 66 is present over the generator, protecting it from rain.

When the remote field generator is operated using unit measures of rubbing alcohol, optionally together with a pipe, a carbon monoxide detector, a water condenser which acts as a heat exchanger for heating water circulated by a water pump from a water tank, dramatic logistical advantages are obtained. In particular, no special fuel is needed to run the generator, and rather than water only rubbing alcohol need be transported. Hot water for bathing is produced as well as drinking water when optional components are included. Noise levels are reduced when optional components are included, by both the water condenser and the pipe, and any dangerous exhaust gasses are vented away from the generator. The optional carbon monoxide detector also provides an additional layer of safety against indoor accumulation of exhaust gasses. All together, recharging of batteries, and/or the operation of small electronic device is provided for, in an efficient manner, with the transportation of a remote field generator; no significant logistical burden is created because rather than transport water, rubbing alcohol which is already available in unit measures may be transported to run the generator and will convert into a similar amount of potable water. Extra benefits also include the generation of heat or hot water for cooking, bathing or drinking.

What is claimed is:

1. A generator system, comprising:
   (i) an internal combustion engine,
   (ii) an exhaust gas outlet, connected to the internal combustion engine, for venting exhaust gasses, and
   (iii) a fuel selector, connected to the internal combustion engine, for adjusting the internal combustion engine to operate more efficiently on at least rubbing alcohol and propane gas,
   wherein the internal combustion engine includes a manual choke.

2. The generator system of claim 1, wherein the internal combustion engine includes a carburetor.

3. The generator system of claim 1, further comprising:
   (viii) a flexible pipe, connected to the exhaust gas outlet, for directing the exhaust gasses,
   (ix) a carbon monoxide sensor, attached to internal combustion engine, and
   (x) a catalytic converter, for reducing carbon monoxide present in exhaust gasses, connected to the exhaust gas outlet,
   wherein the pipe has a length of at least 5 feet.

4. The generator system of claim 1, further comprising:
   (xi) a ventilation fan, electrically connected to the internal combustion engine.

5. The generator system of claim 1, further comprising:
   (xii) a cover, covering the internal combustion engine.

6. The generator system of claim 1, further comprising:
   (xiii) a bottle adaptor, connected to the internal combustion engine, for holding and dispensing a bottle containing a unit measure of liquid fuel.

7. The generator system of claim 1, further comprising:
   (xiv) a hot swap, connected to the internal combustion engine, for removing and connecting a container of gaseous fuel without interrupting flow of a gaseous fuel.

8. The generator system of claim 1, further comprising:
   (xv) a timer, connected to the internal combustion engine, for selecting an amount of time for operation of the internal combustion engine.

9. The generator system of claim 3, wherein the pipe has a length of at least 20 feet.

10. A method of generating electricity with the generator system of claim 1, comprising operating the generator with a fuel consisting essentially of an alcohol.

11. The method of claim 10, wherein the choke is placed between an open position and a closed position.

12. The method of claim 10, wherein the fuel further comprises water.

13. The method of claim 10, wherein the fuel comprises isopropanol and water.

14. The method of claim 10, further comprising adjusting the position of the choke until the revolutions per minute of the internal combustion engine are maximized.

15. The method of claim 10, wherein the fuel comprises at most 10% gasoline.

16. The method of claim 10, wherein the fuel does not comprise gasoline.

* * * * *